United States Patent
Tsukada (10) Patent No.: US 7,188,146 B1
(45) Date of Patent: Mar. 6, 2007

(54) NAVIGATION APPARATUS CAPABLE OF GENERATING AND DISPLAYING INFORMATION AND METHOD THEREFOR

(75) Inventor: Tsunehiro Tsukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,997

(22) Filed: Dec. 7, 1999

(30) Foreign Application Priority Data

Dec. 10, 1998 (JP) .................................. 10-368478

(51) Int. Cl.
G06F 15/16 (2006.01)

(52) U.S. Cl. .................... 709/217; 709/223; 709/224; 703/19; 703/22; 713/500; 713/501

(58) Field of Classification Search ........ 709/223–224, 709/231, 217–218, 235; 707/10, 102; 345/826; 379/32.01; 702/186; 713/500, 501; 703/19, 703/22; 716/6
See application file for complete search history.

(56) References Cited

U.S. PATENT DOCUMENTS

| | | | | |
|---|---|---|---|---|
| 5,724,514 A | * | 3/1998 | Arias | 709/235 |
| 5,908,467 A | * | 6/1999 | Barrett et al. | 709/218 |
| 5,953,506 A | * | 9/1999 | Kalra et al. | 709/231 |
| 6,006,260 A | * | 12/1999 | Barrick et al. | 709/224 |
| 6,078,919 A | * | 6/2000 | Ginzburg et al. | 707/10 |
| 6,078,956 A | * | 6/2000 | Bryant et al. | 709/224 |
| 6,223,221 B1 | * | 4/2001 | Kunz | 709/224 |
| 6,278,449 B1 | * | 8/2001 | Sugiarto et al. | 345/826 |
| 6,332,144 B1 | * | 12/2001 | deVries et al. | 707/102 |
| 6,370,231 B1 | * | 4/2002 | Hice | 379/32.01 |
| 6,393,480 B1 | * | 5/2002 | Qin et al. | 709/224 |
| 6,411,998 B1 | * | 6/2002 | Bryant et al. | 709/224 |
| 6,438,592 B1 | * | 8/2002 | Killian | 709/224 |
| 6,446,028 B1 | * | 9/2002 | Wang | 702/186 |
| 6,587,878 B1 | * | 7/2003 | Merriam | 709/224 |
| 6,807,575 B1 | * | 10/2004 | Emaru et al. | 709/224 |
| 2003/0074379 A1 | * | 4/2003 | Keohane et al. | 707/205 |

* cited by examiner

Primary Examiner—Saleh Najjar
Assistant Examiner—ThuHa Nguyen
(74) Attorney, Agent, or Firm—Fitzpatrick, Cella, Harper & Scinto (57) ABSTRACT

In a navigation system in which the page data loaded from a server are displayed in a terminal, the server receiving the request for data loading from the terminal transmits the requested data if the data generation has ended, but, if not, estimates the end time and transmits the estimated end time together with display information indicating that the data generation is in progress. The terminal, issuing the request for data loading, displays the display data received in response to the request, and, if the estimated end time of data generation is received together with the display data, issues the request for data loading again when the estimated end time is reached. Thus efficient processing can be realized without wasted waiting time or wasted request for data loading in the terminal, in case the data generation requires a long time.

6 Claims, 5 Drawing Sheets

NAVIGATION APPARATUS CAPABLE OF GENERATING AND DISPLAYING INFORMATION AND METHOD THEREFOR

BACKGROUND OF THE INVENTION

1. Field of the Invention

The present invention relates to a navigation apparatus capable of information display and a method therefor.

2. Related Background Art

In the conventional navigation apparatus, in case of dynamically generating and displaying a page or executing a time-consuming process in the server, there is often encountered a situation where a long time is required for generating data of which loading is requested to the server, so that the loading operation cannot be conducted immediately. In such case, the process is conventionally continued either by awaiting the completion of the process or by the following method (1) or (2) or the combination thereof:

(1) executing the loading operation again manually. The user requests the loading again, then there is confirmed whether the data generation has been completed in response to the request, and, if completed, the data loading is started:

(2) executing inspection periodically. Confirmation whether the data generation has been completed is made periodically, for example at an interval of 1 to 60 seconds, and, if completed, the data loading is started.

However, such conventional method (1) is associated with a drawback that, if the loading operation is requested before the completion of data generation, the loading operation cannot be executed as the process is interrupted for example by a time-out.

Also the conventional method (2) is associated with a drawback of increasing the load of the server receiving the communication or of the data communication channel such as a network.

The conventional method (2) is further associated with another drawback that will be explained with reference to FIGS. 6A and 6B.

Figure 6A:
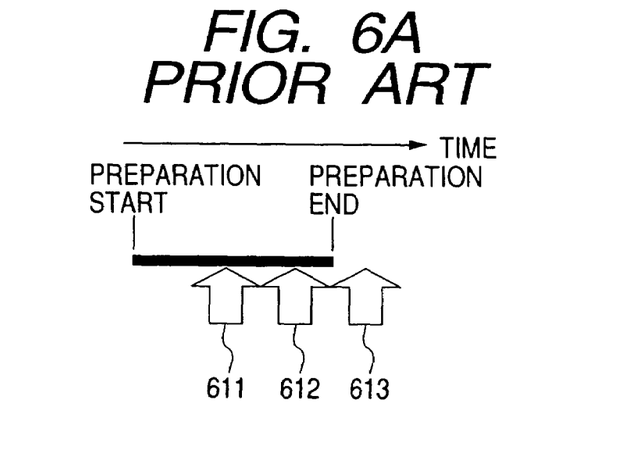
FIGS. 6A and 6B are views showing a conventional periodic data loading request.

FIG. 6A shows a configuration of periodically issuing requests for data loading at a short interval, wherein 611, 612 and 613 indicate requests for data loading. If the requests for data loading are issued at such short interval, requests such as 611, 612 are issued uselessly before the data preparation is completed.

Figure 6B:
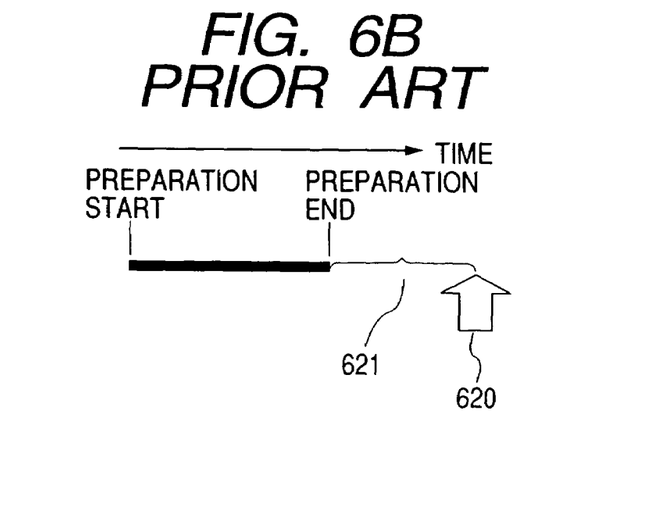

FIG. 6B shows a configuration of periodically issuing requests for data loading at a long interval, wherein 620 indicates a request for data loading. If the requests for data are issued at such long interval, an idle time 621 is generated from the data generation to the issuance of the request 620 for data loading, whereby the data loading is delayed.

SUMMARY OF THE INVENTION

In consideration of the foregoing, an object of the present invention is to provide an efficient information display apparatus capable, in case of loading the data generated in a server, of loading the data promptly after the generation thereof without wasteful request for data loading, and a method therefor.

Another object of the present invention is to provide an information display apparatus capable of reducing the load in the server or in the data communication channel in case of loading the data generated in the server, and a method therefor.

According to one aspect, the present invention which achieves these objectives relates to a data processing method comprising a reception step of receiving a request for data loading from a terminal, an end discrimination step of discriminating whether the generation of requested data is ended, a first transmission step adapted, if the generation of the requested data is ended, to transmit such data, an estimation step adapted, if the generation of the requested data is not ended, to estimate the end time, and a second transmission step of transmitting the estimated end time together with display information indicating that the data generation is in progress.

According to another aspect, the present invention which achieves these objectives relates to a data processing method comprising an issuing step of issuing a request for data loading to a server, a display step of displaying display data received in response to the request, and a re-issuing step adapted, in case the estimated end time of data generation is received together with the display data, to re-issue the request for data loading when such end time is reached.

According to yet another aspect, the present invention which achieves these objectives relates to a data processing apparatus comprising reception means for receiving a request for data loading from a terminal, end discrimination means for discriminating whether the generation of the requested data is ended, first transmission means adapted, if the generation of the requested data is ended, to transmit such data, estimation means for estimating an end time if the generation of the requested data is not ended, and second transmission means for transmitting the estimated end time together with display information indicating that the data generation is in progress.

According to still another aspect, the present invention which achieves these objectives relates to a data processing apparatus comprising issuing means for issuing a request for data loading to a server, display means for displaying display data received in response to the request, and control means adapted, in case an estimated end time for data generation is received together with the display data, to so control said issuing means as to issue again the request for data loading when said end time is reached.

According to still another aspect, the present invention which achieves these objectives relates to a computer readable storage medium storing a data processing program for controlling a computer perform data processing, the program comprising codes for causing the computer to perform a reception step of receiving a request for data loading from a terminal, an end discrimination step of discriminating whether the generation of requested data is ended, a first transmission step adapted, if the generation of the requested data is ended, to transmit such data, an estimation step adapted, if the generation of the requested data is not ended, to estimate the end time, and a second transmission step of transmitting the estimated end time together with display information indicating that the data generation is in progress.

According to still another aspect, the present invention which achieves these objectives relates to a computer readable storage medium storing a data processing program for controlling a computer perform data processing, the program comprising codes for causing the computer to perform an issuing step of issuing a request for data loading to a server, a display step of displaying display data received in response to the request, and a re-issuing step adapted, in case the estimated end time of data generation is received together with the display data, to re-issue the request for data loading when such end time is reached.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which following the description for determining the scope of the invention.

DESCRIPTION OF THE PREFERRED EMBODIMENTS

In the following there will be explained in detail a preferred embodiment of the present invention, with reference to the attached drawings.

First Embodiment

Figure 1:
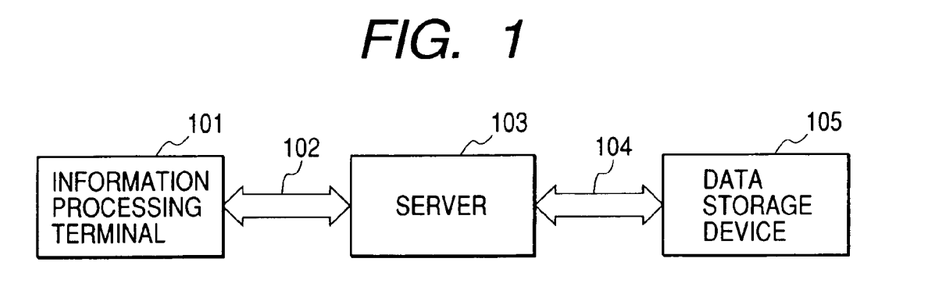
FIG. 1 is a block diagram showing the configuration of a navigation system relating to a first embodiment.

FIG. 1 is a block diagram showing the configuration of a navigation system constituting a first embodiment of the present invention, wherein an information processing terminal 101 is composed for example of a personal computer and is connected with a server 103 through a data transfer path 102. A data storage device 105 is composed for example of a hard disk, and is connected with the server 103 through a data transfer path 104.

Figure 8:
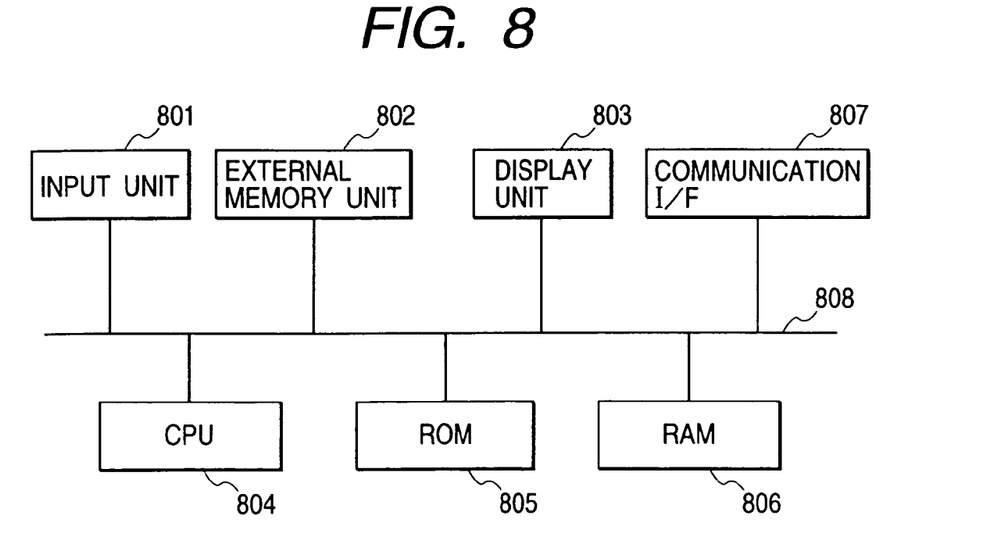
FIG. 8 is a block diagram showing the hardware configuration of the information processing terminal.

FIG. 8 is a block diagram showing the configuration of the information processing terminal 101.

In FIG. 8, an input unit 801 is composed of a keyboard or a pointing device, and is used by the user for entering data and commands. An external memory unit 802 is composed of a memory device utilizing for example a hard disk as the memory medium, and is used for storing data loaded from the server 103. A display unit 803 is composed for example of a CRT or a liquid crystal display device, and is used for displaying a page generated in the server 103 or the result of processing.

A CPU 804 controls various units of the apparatus and reads and executes a program, thereby realizing various processes. A ROM 805 is used for storing fixed data and programs. A control program for realizing a process sequence, to be explained later with reference to a flow chart shown in FIG. 9, may be stored in the ROM 805 or read from the external memory unit 802. A RAM 806 provides a work area required for the processing of the present apparatus. A communication I/F 807, which is an interface for communication, is connected with the data transfer path 102. A bus 808 connects various units.

Figure 2:
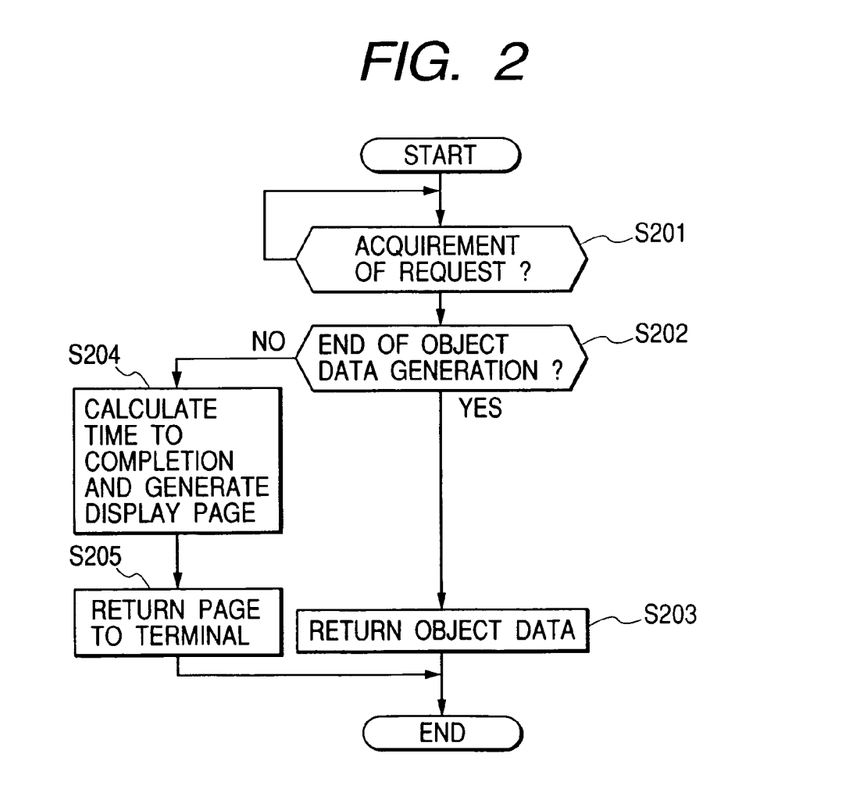
FIG. 2 is a flow chart showing the operation sequence of a server.
Figure 4:
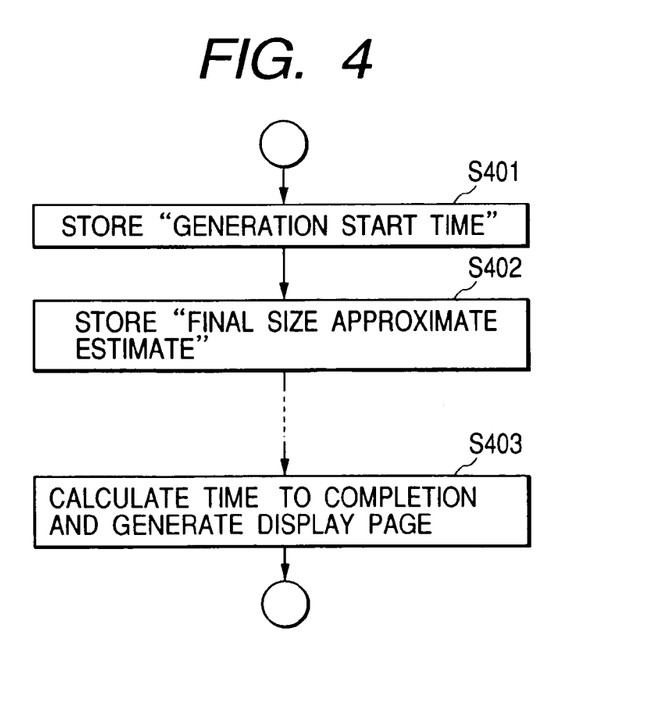
FIG. 4 is a flow chart showing the operation sequence for obtaining an estimated process end time.

The server 103 also has a hardware configuration similar to that of the information processing terminal 101, and a control program for realizing the process sequence to be explained later with reference to flow charts in FIGS. 2 and 4 is stored in a ROM or an external memory unit.

The user or a program on the information processing terminal 101 issues a request for data loading from the information processing terminal 101 to the server 103 through the data transfer path 102. In response to the request, the server 103 prepares the requested data and stores the data in the data storage device 105.

The present embodiment is featured by a fact that the data loading is not postponed until the completion of data preparation, but a display page is returned to the information processing terminal 101 according to the data generation time.

In case the process time is shorter than a predetermined time, the display page is immediately returned to the information processing terminal 101, but, in case the process time is longer than the predetermined time, a page including information for automatically requesting the data loading again at the estimated process end time is returned to the information processing terminal 101.

In either case, the information processing terminal 101 can obtain, from the server 103, the display page itself or information indicating that the process requires time, at a time within the predetermined time.

The function of the server 103 of the above-described configuration will be explained with reference to a flow chart shown in FIG. 2.

At first a step S201 waits until the request for data loading is acquired from the information processing terminal 101. When the request is acquired, a step S202 checks the data storage device 105 to discriminate whether the generation of the requested data has ended. If ended, a step S203 reads the desired data from the data storage device 105 and transmits the data to the information processing terminal 101 through the data transfer path 102, whereupon the process is terminated.

On the other hand, if the step S202 identifies that the generation of the requested data has not ended, a step S204 estimates the time to the end of data generation by calculation, and generates a display page in which the estimated time is added. Then a step S205 transmits the generated display page to the information processing terminal 101 through the data transfer path 102, whereupon the process is terminated.

Figure 9:
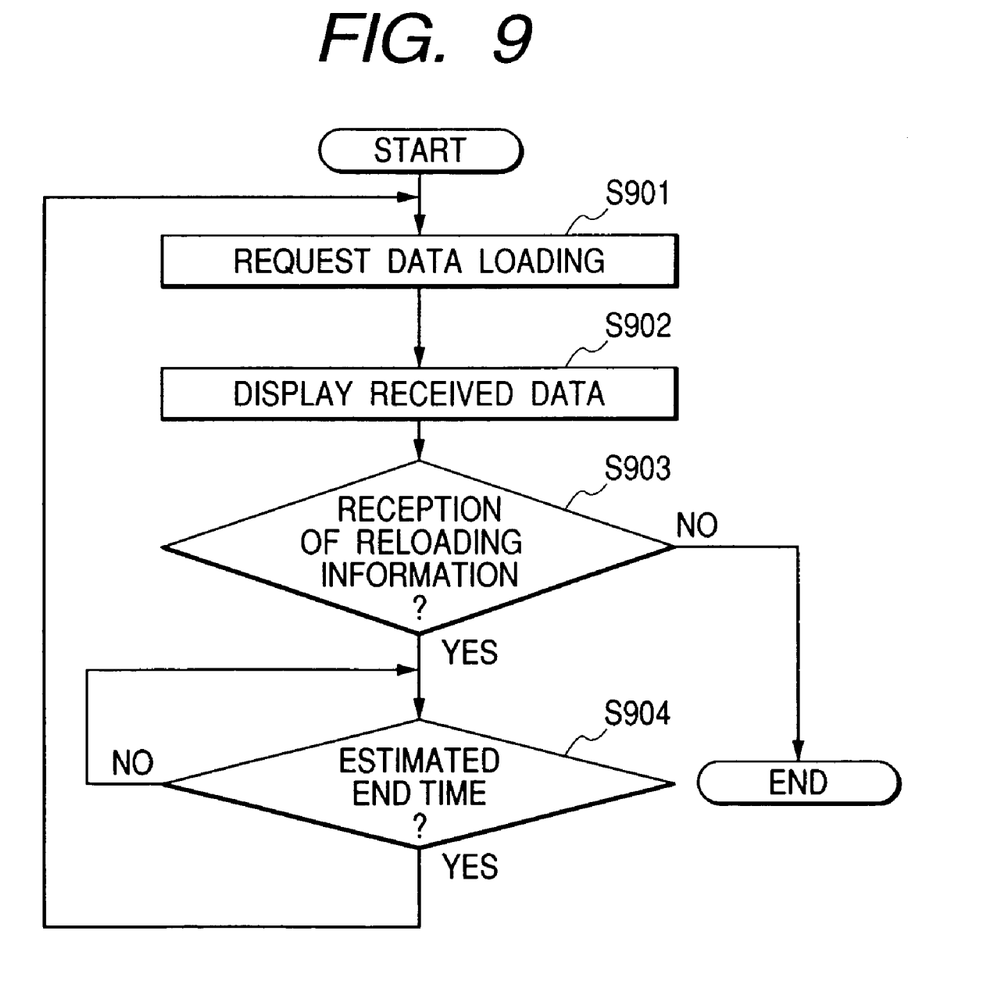
FIG. 9 is a flow chart showing the operation sequence of the information processing terminal.

In the following the function of the information processing terminal 101 will be explained with reference to a flow chart shown in FIG. 9.

At first a step S901 issues a request for data loading to the server 103. A step S902 displays the page received from the server 103 in response to the request, on the display unit 803. If a step S903 receives, together with the display page, re-loading information for automatically requesting the data loading again at the estimated process end time, the sequence proceeds to a step S904. If such information is not received, the process is terminated as the desired page has been received. A step S904 waits until the estimated end time, and, when such end time is reached, the sequence returns to the step S901 to request the data loading again.

Figure 3:
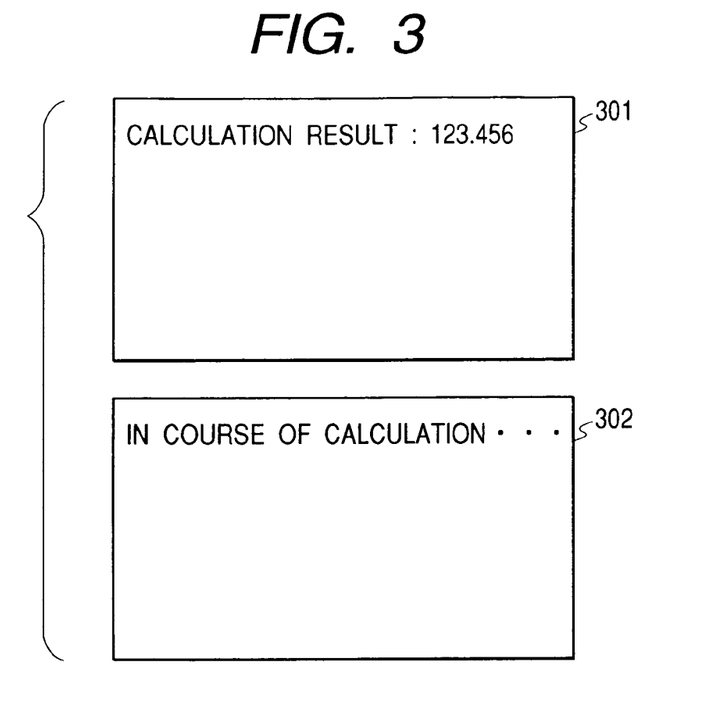
FIG. 3 is a view showing the content of display of received data in an information processing terminal.

FIG. 3 is a view showing the content of display of the received data in the information processing terminal 101 of the present embodiment. A page 301 is the display frame in case the processing does not take time in a system executing request for data processing or data loading by hyperlink. On the other hand, a page 302 is the display frame in case the processing takes time. The page 302 automatically request data loading immediately after the estimated process end time. If the generation of the requested data has ended at the transmission of the second request to the server 103, the page 301 is displayed.

Figure 5:
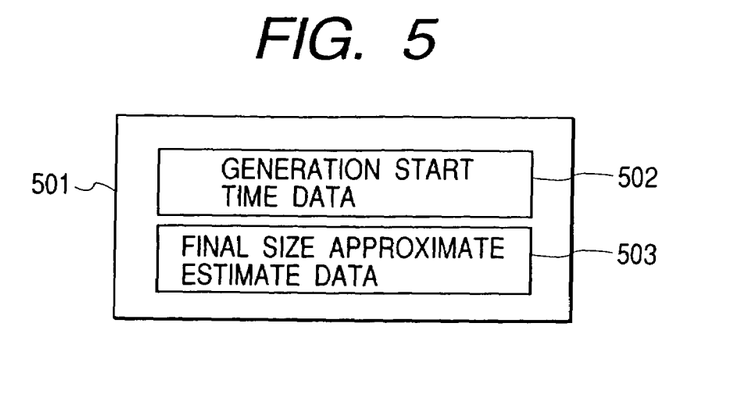
FIG. 5 is a view showing the content of memory for obtaining the estimated process end time.

In the following there will be explained, with reference to a flow chart in FIG. 4 and FIG. 5 showing the memory area of the data storage device 105, the calculation procedure for the estimated process end time of data generation executed on the server 103.

Referring to FIG. 4, a step S401 stores the "generation start time" in an area 502, within an area 501 shown in FIG. 5. A next step S402 stores the "final size approximate estimate data" in an area 503 within the area 501. For example, in case of image data, the final size can be calculated by "width×height×bit depth" of the image.

As an example of approximately estimating the time to the completion from a given time, there can be shown the following arithmetic calculation, utilizing the values stored in the areas 502, 503 and the size of the data prepared up to the current time:

"estimate of final size"×("current time"−"generation start time")÷"size generated up to a given time"="time to completion at the given time", estimated end time="current time"+"time to completion at the given time".

The present embodiment is featured by a fact that the time obtained as explained above is set in the page 302 shown in FIG. 3, as the time for next request for data loading.

The information processing terminal 101 displays the page 302, shown in FIG. 3, on the image display device, and the user may leave the display to automatically execute request for data loading again, or may execute another request by canceling the data loading.

Figure 7:
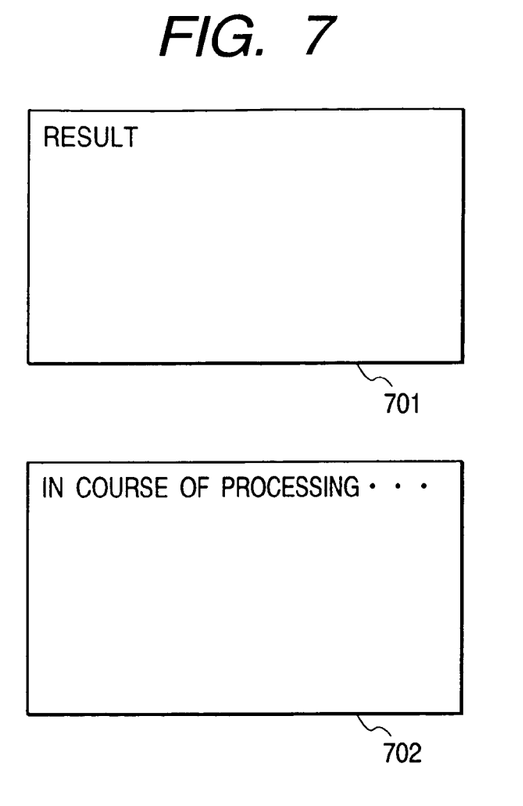
FIG. 7 is a view showing the content of display of the information processing terminal in a second embodiment.

As explained in the foregoing, the present embodiment estimates the end time of data generation and executes request for data loading at the estimated end time, so that there will not result the wasted request for data loading or the wasted waiting time explained in relation to FIGS. 6A and 7B.

Second Embodiment

In the following there will be explained a second embodiment of the present invention with reference to FIG. 7. As the basic configuration of the navigation apparatus of the present embodiment is same as that of the first embodiment shown in FIG. 1, reference is to be made to FIG. 1 as regards the configuration of the present embodiment.

The present embodiment is applied to the display of result in case the server executes a time-consuming process such as printing, fax transmission or mail transmission.

The information processing terminal 101 can continue another process without waiting for the completion of the transmitted request.

FIG. 7 shows the content of display in the information processing terminal 101 of the present embodiment. In case the process in the server does not take a long time, a page 701 indicating the result of process is displayed on the display unit 803 of the information processing terminal 101. On the other hand, in case the process in the server takes a long time, the time to the end of process is approximately estimated and a page 702 indicating that the process is in progress is displayed on the display unit 803 of the information processing terminal 101. The page 702 sets the end time of the process based on the estimated time, the display of the page indicating the result is requested at thus set time.

In case the result is available in response to the repeated request, the result is displayed by the page 701 on the display unit 803 of the information processing terminal 101. In case the result is not available, the server again estimates the time to the end of process, and display the page 702 on the image display device of the information processing terminal 101.

In the above-described navigation apparatus of the present embodiment, process can be executed effectively without the wasteful waiting time or wasteful request for data loading in the information processing terminal, particularly in case a page is dynamically generated and displayed in the image display device of the information processing terminal or in case of executing a time-consuming process in the server.

The present invention may be applied to a system consisting of plural equipment (for example host computer, interface devices, display device, etc.) or an apparatus consisting of a single equipment, within an extent that the functions of the foregoing embodiments can be realized.

Also the present invention includes a case where the program codes of a software realizing the functions of the aforementioned embodiments are supplied to a computer of a system or an apparatus connected to various devices in order to operate the devices so as to realize the functions of the aforementioned embodiments and the functions of the aforementioned embodiments are realized by operating the devices by the computer (CPU or MPU) of the above-mentioned system or apparatus according to the program codes. In such case the program codes themselves of the software realize the functions of the aforementioned embodiments, and the program codes themselves and the means for supplying the computer with such program codes, for example a memory medium storing the program codes, constitutes the present invention.

The memory medium storing such program codes can be, for example, a floppy disk, a hard disk, an optical disk, a magnetooptical disk, a CD-ROM, a CD-R, a magnetic tape, a non-volatile memory card or a ROM.

The present invention also includes such program codes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

In case the present invention is applied to the above-described memory medium, program codes corresponding to the aforementioned flow charts may be stored in such memory medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A data processing method for providing data to a client from a server via a network, the method comprising:
   an issuing step for issuing a request for data loading from said client to the server in response to an instruction by a user;
   a completion discrimination step of the server discriminating, in response to the request for data loading, whether a generation of requested data has completed or is in progress;
   a first transmission step of transmitting from the server to said client the requested data if the generation thereof has completed;
   a prediction step of the server predicting an end time of the generation of the requested data if the generation thereof is in progress;
   a second transmission step of transmitting the predicted end time and information for requesting data loading again at the predicted end time from the server to said client if the generation of the requested data is in progress;
   a display step of the client displaying the requested data or the predicted end time received from the server; and
   a re-issuing step of, in a case where a received data includes the information for re-issuing the request for data loading at the predicted end time, re-issuing the request for data loading from said client to the server without a further instruction by the user when the predicted end time is reached.

2. The data processing method according to claim 1, wherein said prediction step includes predicting the end time based on an amount of data to be generated.

3. The data processing method according to claim 1, wherein the requested data is generated by execution of a predetermined process, and said prediction step includes predicting the end time based on a time required for executing the predetermined process.

4. A data processing system comprising a server and a client, and in which said server provides data to said client via a network, wherein said server comprises:

first reception means for receiving a request for data loading from said client;
completion discrimination means for discriminating, in response to the request for data loading, whether a generation of requested data has completed or is in progress;
first transmission means for transmitting to said client the requested data if the generation thereof has completed;
a prediction means for predicting an end time of the generation of the requested data if the generation thereof is in progress; and
second transmission means for transmitting the predicted end time and information for requesting data loading again at the predicted end time to said client if the generation of the requested data is in progress,
and wherein said client comprises:
issuing means for issuing the request for data loading to the server in response to an instruction by a user;
second reception means for receiving from the server either requested data or the predicted end time together with information for re-issuing the request for data loading at the predicted end time; and
control means for, in a case where a received data includes the information for re-issuing the request for data loading at the predicted end time, controlling said issuing means as to re-issue the request for data loading from said client to the server without a further instruction by the user when the predicted end time is reached.

5. The data processing apparatus system according to claim 4, wherein said prediction means predicts the end time based on an amount of data to be generated.

6. The data processing system according to claim 4, wherein the requested data is generated by execution of a predetermined process, and said prediction means predicts the end time based on a time required for executing the predetermined process.

* * * * *

UNITED STATES PATENT AND TRADEMARK OFFICE
CERTIFICATE OF CORRECTION

PATENT NO. : 7,188,146 B1
APPLICATION NO. : 09/456997
DATED : March 6, 2007
INVENTOR(S) : Tsunehiro Tsukada Page 1 of 1

It is certified that error appears in the above-identified patent and that said Letters Patent is hereby corrected as shown below:

ON THE TITLE PAGE [56] REFERENCES CITED:
U.S. Patent Documents, insert:
--6,427,165 B1   7/2002   Anderson .... 709/217--.

COLUMN 3:
Line 7, "following" should read --follow--.

COLUMN 5:
Line 4, "request" should read --requests--.

COLUMN 6:
Line 8, "display" should read --displays--;
Line 43, "only" should read --only in--; and
Line 45, "also" should read --also in--.

COLUMN 8:
Line 29, "as" should read --so as--.

Signed and Sealed this

Seventh Day of August, 2007

JON W. DUDAS
*Director of the United States Patent and Trademark Office*